April 4, 1961     G. S. BRUNSON, JR     2,977,814
TWO-SPEED DEVICE
Filed June 22, 1960
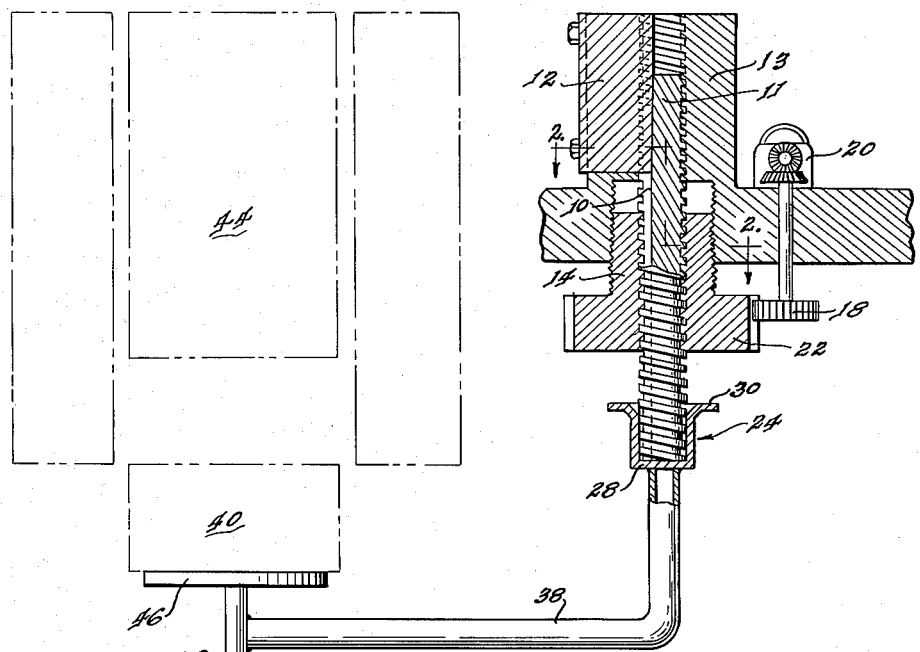
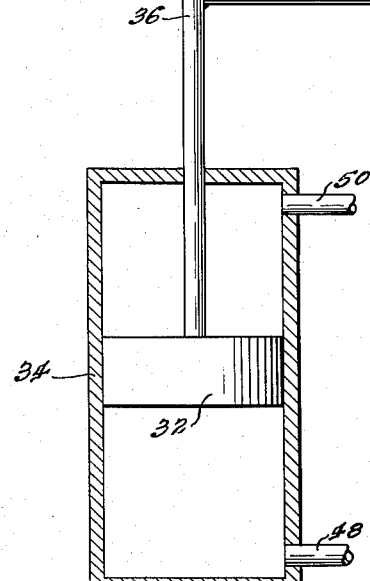
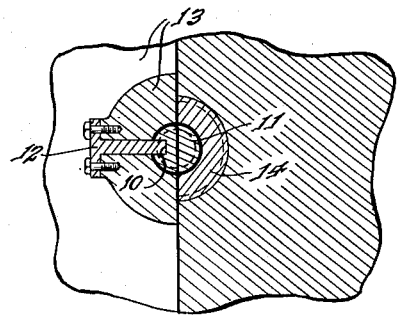
INVENTOR.
Glenn S. Brunson, Jr.
BY
Roland G. Anderson
Attorney United States Patent Office 2,977,814
Patented Apr. 4, 1961

2,977,814
TWO-SPEED DEVICE

Glenn S. Brunson, Jr., Idaho Falls, Idaho, assignor to the United States of America as represented by the United States Atomic Energy Commission Filed June 22, 1960, Ser. No. 38,087

5 Claims. (Cl. 74—424.8)

This invention relates to two-speed devices and more specifically to a two-part stop engageable with a follower.

There are many devices presently available which provide two-speed motion for followers. However, they employ either separate electrical drive motors actuated by position sensing contacts at the crossover point or gear trains having changing gear ratios. Undesirability appears in either of the two methods in that they embrace complexity or unreliability.

It is therefore the object of this invention to provide a two-speed device which will reliably and simply impart two-speed motion to a follower.

Other objects will become apparent as the detailed description proceeds.

Figure 1 shows the device of the present invention in section and illustrates schematically the application of the device to a nuclear reactor.

Figure 2 is a sectional view taken along line 2—2 of Figure 1.

A keyway 10 cut in an inner screw 11 is engaged with an inner fixed member in the form of a key 12 mounted on an outer fixed member 13. The key 12 and associated keyway 10 permit the screw 11 longitudinal movement, but hold it from rotating. An outer screw 14 is in threaded engagement with the inner screw 11 and with a threaded hole in the fixed member 13. The external threads of inner screw 11 and the outer screw 14 are of opposing directions, i.e., left-hand and right-hand threads. A driving gear 18, driven by a reversible motor 20, meshes with a long gear 22, formed as an integral extension of outer screw 14.

A follower cup 24 has a base 28 and a flange 30, which are respectively engageable with the inner screw 11 and the outer screw 14.

The follower 24 may be urged upwardly against the inner screw 11 or the outer screw 14, for example, by pneumatic means comprising a piston 32 and a cylinder 34. The follower 24 is connected with the piston 32 through a piston rod 36 and an arm 38, attached to the piston rod 36 and to the follower 24.

When rotation is imparted to the outer screw 14 via the gears 18 and 22 by the reversible motor 20, the outer screw 14 moves up or down, depending upon the direction of rotation. Because the interior thread on the outer screw 14 is opposed to the exterior thread thereon, the inner screw 11 moves up or down conjointly with the outer screw 14 with respect to the fixed member 13, but at a greater speed than the outer screw 14 with respect thereto. When the screws 11 and 14 are positioned as shown and moving upward, the base 28 of the follower 24 engages the inner screw 11 and the follower 24 moves upward at a speed governed by the fast speed of the inner screw 11. When the inner screw 11 has moved upwardly a predetermined distance with respect to the outer screw 14, the flange 30 of the follower 24 engages the outer screw 14 and the follower 24 moves upward at a speed governed by the slow speed of the outer screw 14. When the reversible motor 20 is reversed in direction, the outer screw 14 will also reverse in rotation and will move the follower 24 downwards at the slow speed of the outer screw 14 until the faster moving inner screw 11 protrudes sufficiently from the lower end of the outer screw 14 to engage the base 28 of the follower 24. The follower 24 will then move downwards at the fast speed of the inner screw 11.

The two-speed device of the present invention may find use in controlling the insertion of a safety plug 40 into a reactor 42 adjacent to the bottom of the core 44. The safety plug 40 is carried on a platform 46 attached to the other end of the piston rod 36. Insertion of the plug 40 controls the reactor 42 by increasing the level of reactivity. The plug 40 can be inserted relatively fast up to a certain point and then must be inserted much more slowly, in order that the reactor 42 may not be operated in a dangerous manner. Air supplied to the lower end of the cylinder 34 through a line 48 moves the safety plug 40 and the follower 24 upward until the plug 40 is a predetermined distance below its fully inserted position in the reactor 42. At this time, the base 28 of the follower 24 engages the fast moving lower end of the inner screw 11.

At this same time, rotation of the outer screw 14 is begun to produce upward movement of the inner and outer screws 11 and 14. The safety plug 40 continues upward at the relatively high speed of the inner screw 11. At a predetermined position of insertion of the safety plug 40 in the reactor 42, the flange 30 of the follower 24 engages the outer screw 14, and now further insertion of the safety plug 40 is at the relatively slow speed of the outer screw 14. When the plug 40 is fully inserted, rotation of the outer screw 14 is discontinued.

During insertion of the plug 40, a line 50 leading to the upper end of the cylinder 34 is connected to exhaust. When the plug 40 is to be slowly withdrawn from the reactor 42, the line 48 is vented so that the plug 40 descends under its own weight.

When an emergency occurs, high pressure air is supplied to the upper end of the cylinder 34 so that the plug 40 is moved quickly out of the reactor 42 under its own weight and air pressure. Since the follower 24 is not connected to the outer screw 14 or the inner screw 11, these screws will in no way interfere with slow or rapid dropping of the safety plug 40 from the reactor 42.

It is to be understood that the piston 32, cylinder 34, and reactor 42 have not been shown to scale, but merely diagrammatically in functional relationship to the two-speed device of the present invention. In actual practice, the two-speed device will probably be below the reactor.

Persons skilled in the art will, of course, readily adapt the general teachings of the invention to embodiments far different than the embodiment illustrated. Accordingly, the scope of the protection afforded the invention should not be limited to the particular embodiment thereof shown in the drawings and described above, but shall be determined only in accordance with the appended claims.

What is claimed is:

1. A two-speed device comprising a two-part stop composed of first and second members having threaded engagement with one another, the first member being restrained against rotation while being capable of moving axially, the second member being arranged to move simultaneously rotatively and axially, means for rotating said second member, and a follower engageable first with an end of one member and then with the corresponding end of the other member after some relative longitudinal movement of the members with respect to one another due to rotation of the said second member and holding of the first member against rotation.

2. A two-speed device comprising a two-part stop composed of an inner screw having an exterior thread and an outer screw having an interior thread engaging the exterior thread of the inner screw; fixed inner and outer members having engagement with the inner and outer screws, respectively, the engagement between one screw and the associated fixed member being such as to prevent rotation of the said one screw but to provide for axial movement thereof, the engagement between the other screw and the associated fixed member being formed between screw threads formed thereon so as to provide for axial and rotative movements of the said other screw; and a follower engageable first with an end of one screw and then with the corresponding end of the other screw after some longitudinal movement of the screws with respect to one another.

3. A two-speed device comprising a two-part stop composed of an inner high-speed screw having an external thread, and an outer low-speed screw having an external thread and an internal thread engaging the external thread of the inner screw; an inner fixed member engaging the inner screw so as to prevent rotation thereof but to provide for axial movement thereof; an outer fixed member having a threaded hole engaging the exterior thread of the outer screw to provide for axial and rotational movement thereof; and a follower engageable first with an end of the inner screw and then with the corresponding end of the outer screw after some longitudinal movement of the screws with respect to one another.

4. The device as specified in claim 3, the follower being a cup having a flange and being of such size that said inner screw can engage the base of said cup and said outer screw can engage said flange of said cup.

5. A two-speed device comprising a two-part stop composed of an inner high-speed screw having an external thread and a keyway cut therein, and an outer low-speed screw having an external thread and an internal thread engaging the external thread of the inner screw; an outer fixed member having a threaded hole engaging the exterior thread of the outer screw to provide for axial and rotational movement thereof; a key mounted on said outer fixed member engaging the keyway in said inner screw so as to prevent rotation thereof but to provide for axial movement thereof; and a follower engageable first with an end of the inner screw and then with the corresponding end of the outer screw after some longitudinal movement of the screws with respect to one another.

References Cited in the file of this patent
UNITED STATES PATENTS

| | | |
|---|---|---|
| 2,247,562 | Santen | July 1, 1941 |
| 2,253,535 | Weinig | Aug. 26, 1941 |